J. S. PERRY.
Magazine Stove.
No. 86,940.  Patented Feb. 16, 1869.
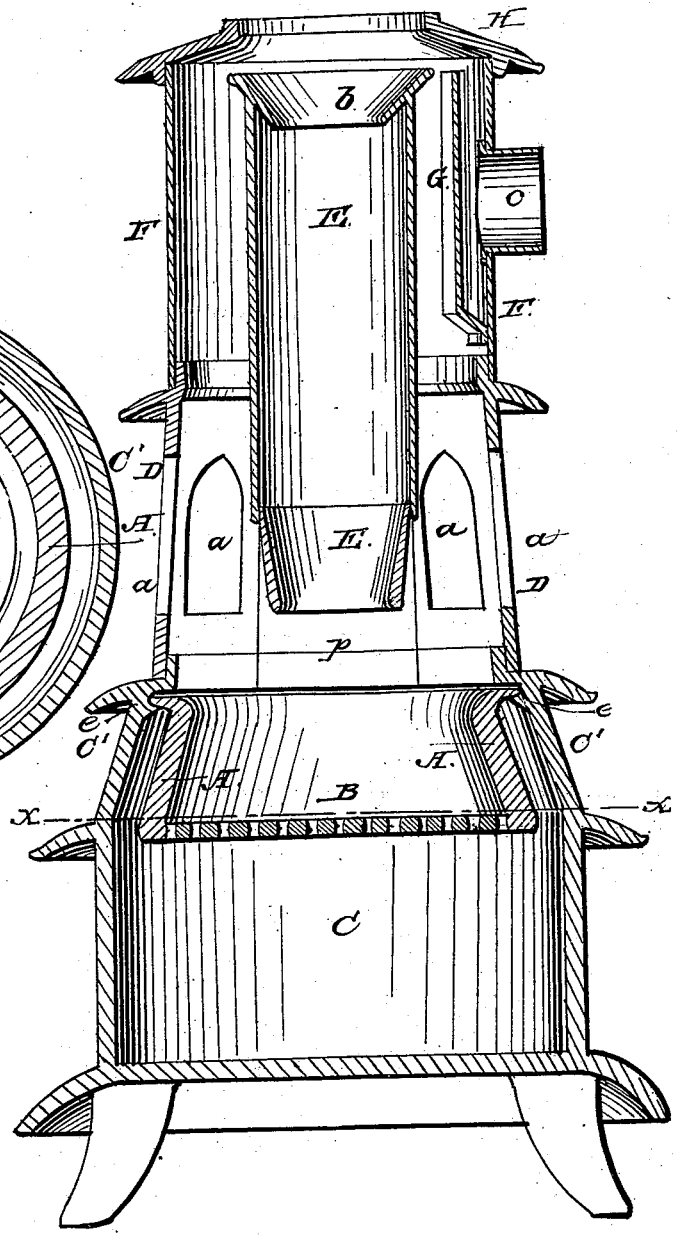

JOHN S. PERRY, OF ALBANY, NEW YORK.

Letters Patent No. 86,940, dated February 16, 1869.

IMPROVEMENT IN BASE-BURNING STOVES.

The Schedule referred to in these Letters Patent and making part of the same.

*To all whom it may concern:*

Be it known that I, JOHN S. PERRY, of Albany, in the county of Albany, and State of New York, have invented a new and useful Improvement on Fire-Pots, applicable to magazine-stoves, ranges, and furnaces; and I do hereby declare that the following is a full, clear, and exact description thereof, reference being had to the accompanying drawings, making a part of this specification, in which—

Figure 1 is a diametrical section through a fuel-magazine heating-stove, having the improved fire-pot.

Figure 2 is a horizontal section taken through fig. 1, in the plan indicated by line $x\ x$, looking upward.

Similar letters of reference indicate corresponding parts in both figures.

This invention relates to an improvement on stoves, ranges, and furnaces, which are provided with reservoirs, or magazines, for containing fuel in large quantities, and supplying it to the fire-pots as rapidly as it is consumed therein.

The nature of my invention and improvement on the above-mentioned class of stoves, for ranges and furnaces, consists in a circular or elliptical fire-pot, which flares downwardly, so as to present a smaller opening at its upper end than at its base or grate, and which is arranged below the discharge-opening of a fuel-magazine, so as to leave a free annular combustion-space around, or partially around the upper end of said pot, in the centre, or at one side of which space, the coal, in process of combustion, descends from the magazine in a conical pile, as will be hereinafter described.

To enable others skilled in the art to understand my invention, I will describe its construction and operation.

The stove, which I have represented in the accompanying drawings, is what is termed a direct-flue stove, wherein the products of combustion are carried upward and conducted off through an escape-pipe, without being returned and passed through revertible flues to the base of the stove before being carried off. The invention is, however, applicable to stoves, ranges, and furnaces having revertible flues.

A is the fire-pot, which is represented as being suspended by its upper end from lugs or ledges $e$, formed upon the inner surface, and near the upper end of the surrounding wall, C'.

C is the ash-pit, beneath the fire-pot.

B is the grate, at the base of the fire-pot.

P is the annular combustion-space, above the fire-pot, and

D is the illuminated section of the stove, which surrounds the combustion-space P, and is perforated at $a\ a$ for transparent windows, if such windows are required.

E represents the fuel-magazine, which is arranged over the fire-pot A, so as to supply fuel thereto, and which is provided with a funnel, $b$, at its upper end, through which fuel is supplied.

F is the upper section of the stove, which terminates in a cap, H, and

G is a passage, open at its top and closed at its bottom, through which the products of combustion pass, in order to escape through the pipe or flue C.

It will be seen, from the above description, that, with the single exception of the fire-pot, the stove which I have represented is the simplest kind of a magazine-heater without revertible flues.

The fire-pot A is made smallest at its upper end and largest at its lower end, at which latter point a grate of any suitable kind is applied, as shown in fig. 1.

By thus constructing a circular or elliptical fire-pot for a fuel-magazine stove, range, or furnace, with its side wall leaning inwardly toward its centre, several important advantages are secured over the upwardly-flaring or straight fire-pots hitherto used, to wit, an enlarged grate-surface, which is the gauge for the power of the stove, other things being equal; the fire will keep in longer, as the incandescent coals will be inclined to rest one upon another, instead of against the sides of the fire-pot; the ashes and dead coals cannot lodge against the side of the fire-pot, and the least agitation of the grate will clear the pot at once of incombustible matter; and in a straight or direct flue-stove the downwardly-flaring pot is especially desirable, as by the enlarged base and cone-shape, the largest part of the fire is nearest the base of the stove; hence the lower part of a room will receive considerable heat, which would not be the case if the pot flared upwardly.

In hot-air furnaces, a large amount of heat should be obtained from the walls of the fire-pots, and with my improved pot the impinging of the heat against and through it, is far greater than with the old form, as with the latter, the sides of the pots fall away from the fuel, and are more or less protected by a non-conducting coating, formed by the accumulation of ashes against it, which, with the upwardly-contracted pot, cannot occur.

In the year 1860, J. C. Henderson obtained Letters Patent of the United States for a cooking stove, having a fire-chamber which is smaller at its upper end than it is at its base, and to which the fuel is supplied from a magazine, arranged on one side of it, through one of its inclined walls.

In this stove the upwardly-contracted fire-chamber is made so high as to extend considerably above the level of the fuel in it, for the purpose, as is alleged, of retaining the gases evolved from the fuel until they are consumed, or nearly so.

I do not, therefore, claim an upwardly-contracted fire-chamber, irrespective of the combination, and arranged substantially as herein described and shown.

Having described my invention,

What I claim as new, and desire to secure by Letters Patent, is—

An upwardly-contracted fire-pot, combined with and arranged beneath the discharge-opening of a fuel-magazine, substantially as described.

JOHN S. PERRY.

Witnesses:
JOHN A. ZWEERES,
FRANK W. BENDER.